United States Patent [19]
Ross et al.

[11] Patent Number: 5,552,516
[45] Date of Patent: Sep. 3, 1996

[54] SOLUBLE, CROSSLINKED POLYASPARTATES

[75] Inventors: Robert J. Ross, Elmhurst; Kim C. Low, Alsip; Larry P. Koskan, Orland Park, all of Ill.

[73] Assignee: Donlar Corporation, Bedford Park, Ill.

[21] Appl. No.: 263,459

[22] Filed: Jun. 22, 1994

[51] Int. Cl.$^6$ .................................. C08G 69/00
[52] U.S. Cl. .................. 528/363; 528/378; 528/345; 528/360; 525/418; 525/419; 525/420
[58] Field of Search .................. 528/328, 363, 528/360, 345; 525/418, 419, 420

[56] References Cited

U.S. PATENT DOCUMENTS

| | | | |
|---|---|---|---|
| 3,846,380 | 11/1974 | Fujimoto et al. | 525/420 |
| 5,057,597 | 10/1991 | Koskan | 528/328 |
| 5,116,513 | 5/1992 | Koskan et al. | 210/698 |
| 5,219,952 | 6/1993 | Koskan et al. | 528/363 |
| 5,221,733 | 6/1993 | Koskan et al. | 528/363 |
| 5,284,512 | 2/1994 | Koskan et al. | 252/356 |
| 5,286,810 | 2/1994 | Wood | 525/421 |
| 5,288,783 | 2/1994 | Wood | 525/418 |
| 5,292,858 | 3/1994 | Wood | 528/345 |
| 5,315,010 | 5/1994 | Koskam et al. | 548/520 |
| 5,357,004 | 10/1994 | Calton et al. | 525/435 |
| 5,367,047 | 11/1994 | Wood | 528/363 |
| 5,373,086 | 12/1994 | Koskan et al. | 528/328 |
| 5,373,088 | 12/1994 | Koskan et al. | 528/363 |

Primary Examiner—Shelley A. Dodson
Assistant Examiner—P. Hampton-Hightower
Attorney, Agent, or Firm—Olson & Hierl, Ltd.

[57] ABSTRACT

Disclosed are methods of producing high molecular weight, soluble, crosslinked polyaspartates from crosslinked polysuccinimide. In one preferred method aspect, polysuccinimide is first reacted with an organic crosslinking agent, preferably an organic base containing at least two primary amine groups to form a crosslinked polysuccinimide. The crosslinked polysuccinimide is then hydrolyzed to crosslinked polyaspartate which is soluble in polar solvents, preferably water, alcohol and mixtures thereof. Alternative method aspects are disclosed in which soluble crosslinked polyaspartates are produced in a single reaction vessel by sequentially crosslinking polysuccinimide with the organic crosslinking agent in an aqueous reaction mixture and hydrolyzing the product to crosslinked polyaspartate.

26 Claims, No Drawings

SOLUBLE, CROSSLINKED POLYASPARTATES

FIELD OF THE INVENTION

The present invention is in the field of polymer formation. More particularly the invention relates to a method of producing soluble, crosslinked polyaspartates from crosslinked polysuccinimides.

BACKGROUND OF THE INVENTION

Polyaspartic acid has shown utility in a wide variety of applications such as scale inhibition in water treatment, tartar control in oral hygiene products, as a detergent builder and anti-redeposition agent in detergent formulations, as a corrosion inhibitor, and in agricultural applications.

Most of the current methods of producing polyaspartic acid or salts of polyaspartic acid produce polymers of relatively low molecular weight. U.S. Pat. No. 5,221,733 to Koskan teaches the thermal polymerization of aspartic acid to polysuccinimide and its subsequent hydrolysis with aqueous base to afford polyaspartates of molecular weight of about 3000 to about 6000 daltons. In U.S. Pat. No. 5,288,783, Wood describes the thermal polymerization of ammonium salts of maleic and fumaric acid to produce relatively low molecular weight polyasparatate of about 2000 daltons after base hydrolysis.

Some attempts to obtain higher molecular weight copolymers of maleic acid, ammonia and diamines by thermal polymerization are described in U.S. Patent No. 5,286,810 also to Wood. However, the Wood method is complex, requiring multiple steps in manipulating the reaction mixture during the polymerization and the polymers produced are highly colored and of modestly higher molecular weights than are obtained in the absence of diamine.

In many applications, performance characteristics are a function of the molecular weight of a polymer. It is often desirable to be able to produce a range of molecular weights to optimize the performance of a particular polymer to the application in which it will be used. Higher molecular weight polymers often have greatly different performance characteristics than the corresponding lower molecular weight polymers. In some applications, performance characteristics are adversely affected at higher molecular weights, whereas in other applications, performance characteristics may be enhanced.

The chemical modification of polysuccinimide to produce useful materials is well known. Koskan, et al., in U.S. Pat. Nos. 5,057,597, 5,116,513, 5,219,952 and 5,221,733 describe inexpensive methods for manufacturing polysuccinimide and polyaspartic acid. In the article by Neri, et al., "Synthesis of alpha, beta-Poly [(2-hydroxyethyl) DL-aspartamide], a New Plasma Expander," *Journal of Medicinal Chemistry*, Vol. 16, pp 893–897 (1973), the authors describe the modification of polysuccinimide with ethanolamine to produce yet another useful product.

Fujimoto et al. in U.S. Pat. No. 3,846,380 describe the formation of modified polypeptides having hydrophobic and hydrophilic substituents as side chains by reacting polysuccinimide with at least one primary or secondary aliphatic amine and then hydrolyzing the resulting polyamide derivative with alkali to produce polypeptides that are useful as surface active agents.

However, there still exists a need for a simplified and cost-effective method of producing higher molecular weight soluble crosslinked polyaspartates. The present method satisfies that need.

SUMMARY OF THE INVENTION

The present invention provides a method of producing relatively high molecular weight soluble, crosslinked polyaspartates by the chemical modification of polysuccinimide. The term "polyaspartates" as used herein includes polyaspartic acid as well as salts of polyaspartic acid. Polyaspartates of the present invention can be synthesized by several methods, all of which initially involve the reaction of polysuccinimide with an organic crosslinking agent.

More particularly, the method comprises reacting polysuccinimide with an organic crosslinking agent that is an organic base comprising at least two primary amine groups in an amount sufficient to form crosslinked polysuccinimide. The crosslinked polysuccinimide is subsequently hydrolyzed with base to form soluble crosslinked polyasparatate.

In one preferred method aspect, polysuccinimide is first reacted with an organic crosslinking agent in a polar aprotic solvent to form crosslinked polysuccinimide. The crosslinked polysuccinimide is then recovered for subsequent hydrolysis to crosslinked polyasparatate which is soluble in polar solvents such as water, alcohol and mixtures thereof.

Advantageously, soluble crosslinked aspartates can be prepared in a single reaction vessel in alternative preferred method aspects using aqueous media. In one method aspect, soluble crosslinked aspartates are prepared by first reacting polysuccinimide in an aqueous reaction mixture containing an effective crosslinking amount of organic crosslinking agent or salt thereof from which free organic crosslinking agent can be released by base hydrolysis to produce crosslinked polysuccinimide. The crosslinked polysuccinimide product can then be further base hydrolyzed to produce crosslinked polyasparatate.

The polymers of the present invention are useful in a wide variety of applications, for example, as sludge coagulants, dispersants, flocculating agents and scale inhibitors in water treatment; in down hole oil field applications as corrosion inhibitors, scale inhibitors and dispersants; as viscosity modifiers and corrosion inhibitors in the petroleum industry; as thickening agents; as tartar control agents in oral hygiene products, as detergent builders, anti-redeposition agents, dispersants and corrosion inhibitors in detergent formulations, as useful chemical intermediates and as components in consumer products for personal care and the like.

DETAILED DESCRIPTION OF THE INVENTION

As stated earlier, the term "polyaspartate" and grammatical variations thereof as used herein includes polyaspartic acid and salts thereof. The term "polysuccinimide" as used herein defines a homopolymer having the structural formula (I), wherein n is greater than about 5.

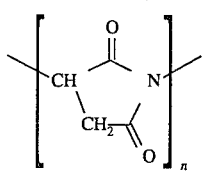

(I)

The crosslinked polymers of this invention are random copolymers structurally comprised of monomer units of succinimide (structural formula S), alpha-aspartate (structural formula A), beta-aspartate (structural formula B) and crosslinking dimeric aspartamides (structural formula having any one of the following three structural formulas, $L^1$, $L^2$, and $L^3$. For convenience, these will be referred to collectively as structural formula (L).

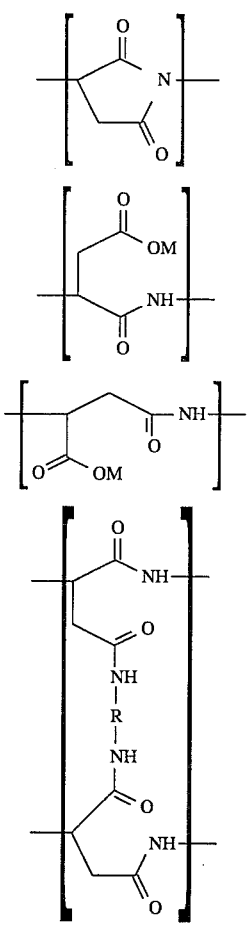

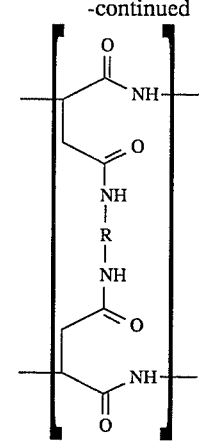

In the structural units, A and B, M can be hydrogen, an alkali metal cation such as $Na^+$, $K^+$ or $Li^+$, ammonium, or quaternary ammonium. In the structural L units, $L^1$, $L^2$ and $L^3$, R is a divalent organic linking group derived from the organic crosslinking agent, preferably containing 1 to about 20 carbon atoms and optionally aliphatic and/or aromatic ring structures. The organic crosslinking agent preferably is an organic base containing at least two primary amine groups capable of reacting with a succinimide monomer unit to form a crosslink thereof. For convenience, reference to "L units" includes any one of the monomeric crosslinking L structural units without limitation.

The term "crosslinked polyaspartate" or "crosslinked polyaspartic acid" as used herein refers to water-soluble random copolymers structurally comprised primarily of A, B and L units. For convenience the term "crosslinked polyaspartates" is used herein to refer to such soluble polymers having a relatively high weight average molecular weight of at least about 2,000. Crosslinked polyaspartates preferably contain no S units or relatively small proportions of less than about 20%. The term "crosslinked polysuccinimide" as used herein refers to random copolymers comprised primarily of S and L units. Crosslinked polysuccinimides preferably contain no A and B units or relatively small proportions of A and B units so that the combined amount A+B units is less than about 20%.

For convenience, the methods of this invention will be illustrated and discussed using an organic crosslinking agent that is an organic base having two primary amine groups available for reaction with the succinimide monomer units of polysuccinimide to form a crosslink, referred to hereafter as "diamine crosslinking agent".

Useful polysuccinimide for the methods of this invention may be synthesized by any method, for example by thermal polymerization of aspartic acid, by thermal polymerization of aspartic acid in the presence of phosphoric acid or polyphosphoric acid, by thermal polymerization of maleic acid and ammonia, or any other method. Preferably, the weight average molecular weight ($M_w$) of polysuccinimide ranges from about 500 to greater than about 100,000, more preferably between about 1500 to about 50,000.

For a polysuccinimide of a given $M_w$, there is a limit to the amount of given diamine crosslinking agent that can be added to produce a substantially water soluble polymer thereof. Addition of diamine crosslinking agent beyond a given limit results in a substantially water insoluble polymeric network or gel.

The amount of the diamine crosslinking agent preferably ranges from about 0.001 moles to about 2 moles per kilogram of polysuccinimide. Using a formula weight (FW) of 97 for polysuccinimide (based on the formula weight of a succinimide monomer unit), the amount of diamine crosslinking agent component can also be expressed as moles of diamine per mole of succinimide units×100%, hereafter referred to as mol %. On this basis, the amount of diamine crosslinking agent preferably ranges from about 0.1 mol % to about 30 mol %. The preferred mol % of a given diamine crosslinking agent is dependent upon the weight average molecular weight ($M_w$) of the polysuccinimide to be modified.

For polysuccinimides having a $M_w$ of between about 500 and about 4000, the amount of diamine crosslinking agent preferably is from about 1 mol % to about 20 mol %. For polysuccinimides having a $M_w$ of between about 4000 to about 30,000, the amount of diamine crosslinking agent preferably is from about 0.5 mol % to about 15 mol %. For polysuccinimides having a $M_w$ greater than about 10,000 the mol % amount of diamine crosslinking agent preferably is from about 0.1 to about 5. Crosslinking can occur between adjacent polymer chains or within the same polymer chain or both. Multiple crosslinks also can be incorporated into the polymer chains.

Compounds useful as diamine crosslinking agents in the method of the present invention include, but are not limited to, aliphatic diamines, such as ethylene diamine (EDA), 1,3-bis(aminoethyl)cyclohexane (1,3-BAC), and hexamethylene diamine (HMDA); arylaliphatic diamines, such as meta-xylylene diamine (MXDA); and polyether diamines, such as polyoxyalkylene diamines and amine terminated block copolymers of polyoxyalkylene/polyalkylene glycols, sold in varying approximate molecular weights ranging from about 230 to about 2,000 under the trademark JEFFAMINE™ by Texaco Chemical Company.

According to the supplier, the JEFFAMINE™ D series products are amine terminated polypropylene glycols having an average of from about 2 to about 68 propylene oxide units, the JEFFAMINE™ ED series products are amine terminated polyethylene/polypropylene glycols, having a predominantly polyethylene oxide backbone and the following general structural formula (II) where the average approximate value of the a+c units is about 2.5 and that of the b unit is from about 8 to about 40.5.

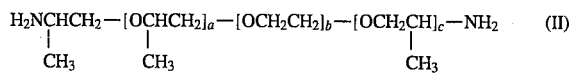

Other useful polyether diamines are triethylene glycol diamine (JEFFAMINE™ EDR-148) and tetraethylene glycol diamine (JEFFAMINE™ EDR-192).

Also useful are amine terminated polyalkyleneimines, such as amine terminated polyethyleneimines, including for example, diethylene triamine (DETA) and tetraethylene pentamine (TEPA).

Additionally, triamino, tetraamino and polyamino organic compounds can also be used as organic crosslinking agents to form new polymeric networks of the present invention. The use of such amino compounds can further lead to incorporation of linking monomer units such as the following $L^4$ and $L^5$ structural formulas, where $R^2$ is a trivalent or tetravalent organic radical linking group derived from the organic crosslinking agent.

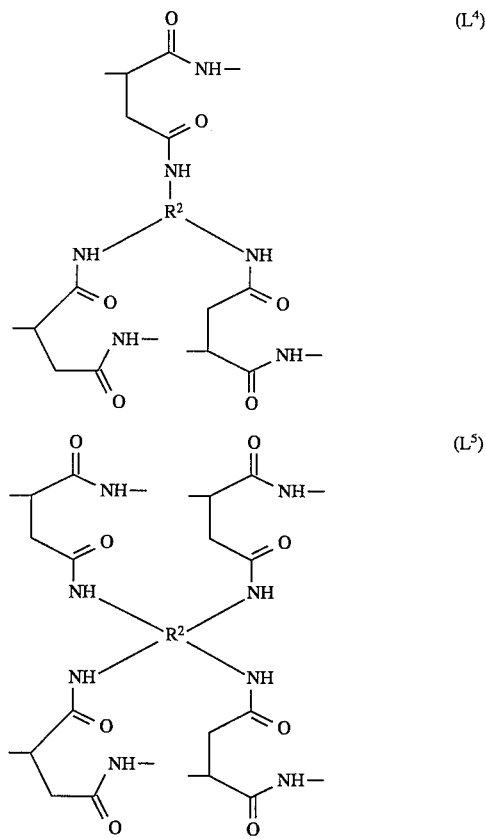

Examples of triamino, tetraamino and polyamino compounds useful as organic crosslinking agents in the present invention include, but are not limited to tris(2-aminoethyl)amine (TAEA), polyamine compounds sold under the trademark STARBURST™ Dendrimers by Dendritech, Inc., the propylene oxide based triamine series sold in various approximate molecular weights ranging from about 440 to about 5,000 under the trademark JEFFAMINE™ T by Texaco Chemical Company, and polyvinylamine polymers.

Molecular weight determination of soluble crosslinked polyaspartates of the present invention were made using Gel Permeation Chromatography (GPC). Solutions were adjusted to pH 9.5 before dilution with eluent. GPC was performed on a Shimadzu LC10AD Chromatograph with UV detection set at 220 nanometers (nm) utilizing 2 Synchrom GPC columns in tandem: GPC 500 and GPC 1000 (250 mm×4.6 mm, each). Weight average molecular weight ($M_w$), number average molecular weight ($M_n$), and polydispersity ($M_w/M_n$) were determined using a Hitachi D-2520 GPC Integrator and the standards shown in Table 1.

TABLE 1

GPC STANDARDS

| Standard | Peak Mol. Wt. ($M_p$) | Wt. Ave. Mol. Wt. ($M_w$)** | Number Ave. MW ($M_n$) | Polydisp. ($M_w/M_n$) |
|---|---|---|---|---|
| Sodium PA* | 16,000 | 18,100 | 12,800 | 1.41 |
| Sodium PA* | 4,100 | 5,660 | 3,450 | 1.64 |
| Sodium PA* | 1,250 | 1,930 | 1,230 | 1.57 |
| Disodium L-aspartate | 177 | 177 | 177 | 1.00 |

*Sodium polyacrylate from Polysciences Inc.
**As reported by Polyscience Inc.; measured by Low Angle Light Scattering (LALS).

The $M_w$, $M_n$ and $M_w/M_n$ of crosslinked polymers produced were determined by comparison to a calibration curve developed by linear correlation of retention time versus the log of the peak molecular weight ($M_p$) of the four standards. Elution was performed with 0.05 N $KH_2PO_4$ buffer (pH 7). Values for $M_w$ and $M_n$ typically vary by about ±10%.

It is known that GPC, (also known as size exclusion chromatography or SEC) measures molecular size, not molecular weight. Molecular weight is proportional to molecular size, however, so GPC is commonly used for molecular weight determinations, and the GPC $M_w$ values attained are commonly accepted in the polymer field as a measure of molecular weight. Because molecular size is what is actually measured in GPC, the choice of polymers used as calibration standards is very important. Linear sodium polyacrylates have a very similar size and shape and charge density to linear sodium polyaspartates in solution and thus show a good correlation for molecular weight determinations.

It is recognized that crosslinked polyaspartates are non-linear in nature and will, in fact, have a smaller size than linear polyaspartates of the same molecular weight. Because the degree of crosslinking and the ratio of intermolecular to intramolecular crosslinking will have an effect on the size and shape of the polymers, therefore, there is no one ideal set of standards to use for molecular weight determinations of crosslinked polymers. Consequently, linear polyacrylate standards of low polydispersity were chosen with the understanding that the values for molecular weights measured are likely lower than the actual molecular weights of the crosslinked polyaspartates of the present invention.

Crosslinked polyaspartates of this invention preferably have a weight average molecular weight of at least about 2,000 and are soluble in polar solvents, such as water, alcohol and mixtures thereof. Alcohols can be monohydric, dihydric, trihydric and polyhydric so long as the crosslinked polyaspartate is soluble.

Briefly described, in one preferred method aspect, high molecular weight soluble crosslinked polyaspartate is produced by first crosslinking polysuccinimide with an organic crosslinking agent in the presence of a polar aprotic solvent. The crosslinked polysuccinimide product is then isolated from the reaction mixture, collected and hydrolyzed to crosslinked polyaspartate.

Useful polar aprotic solvents include dimethylsulfoxide, dimethyl formamide and dimethylacetamide but are not limited thereto. Preferably the aprotic solvent is water-miscible. The crosslinked polysuccinimide product is preferably isolated by admixing the reaction mixture with a polar solvent, preferably water or an alcohol, in which the polar aprotic solvent is soluble but in which the crosslinked polysuccinimide product is not soluble to precipitate the polymer. The precipitated crosslinked polysuccinimide polymer can then be collected for hydrolysis to soluble crosslinked polyaspartate.

In an alternative method aspect, soluble crosslinked polyaspartate can be produced in an aqueous reaction mixture using a single reaction vessel.

For example, in one method aspect, an aqueous solution of organic crosslinking agent is first neutralized with a sufficient amount of a relatively strong mineral acid, preferably hydrochloric acid, to form a soluble acid salt thereof. Next, polysuccinimide is admixed therein to form a slurry with the salt solution. The polysuccinimide is subsequently crosslinked by hydrolyzing the organic crosslinking salt with aqueous sodium hydroxide in an amount sufficient to release free organic crosslinking agent in the reaction mixture to produce crosslinked polysuccinimide. The crosslinked polysuccinimide product is then further base hydrolyzed to soluble crosslinked polyaspartate. In another method aspect, polysuccinimide can be slurried in water and the slurry admixed with an effective crosslinking amount of organic crosslinking agent to produce crosslinked polysuccinimide, which is then further base hydrolyzed to soluble crosslinked polyaspartate.

The following examples illustrate the preparation of embodiments of soluble crosslinked polyaspartates of the present invention from crosslinked polysuccinimide by the methods discussed. The examples and methods presented are illustrations of preferred embodiments and are not intended as limitations.

Crosslinked Polysuccinimides; General Method

To illustrate the methods of this invention below, crosslinked polysuccinimides described in Examples 1–6, were prepared by the following general method. The molecular weight data values for polysuccinimides used for preparing crosslinked polysuccinimides were either a $M_w$ of about 5030, Mn of about 1750 and an $M_w/M_n$ of about 2.9 or a $M_w$ of about 2040, $M_n$ of about 740 and an $M_w/M_n$ of about 2.8 as indicated below.

Polysuccinimide having a given $M_w$ of either about 5100 or about 2100 was first dissolved in either dimethylsulfoxide (DMSO) or dimethylformamide (DMF). A selected mol % amount of diamine crosslinking agent was then added to the dissolved polysuccinimide. The reaction mixture can be heated to accelerate the crosslinking reaction. Preferably, the temperature of the reaction mixture was in the range of from about 25° C. to about 60° C., more preferably in the range of from about 40° C. to about 50° C. The resulting crosslinked polysuccinimide product was then isolated by pouring the reaction mixture into a solvent, such as water or an alcohol, in which the polar aprotic solvent was soluble, but in which the polymer was not. This produced a precipitate of crosslinked polysuccinimide, which was then isolated by filtration and substantially dried to a solid.

EXAMPLE 1

Synthesis of Crosslinked Polysuccinimide

As shown in Table 2, polysuccinimide having an $M_w$ of about 5030 (10 g, 100 mmol succinimide units) was dissolved in DMSO (100 mL) at a temperature of about 40° C.

Metaxylylenediamine (MXDA) (1.5 g, 11 mmol) was then added with stirring over a period of about 5 minutes and the temperature heated to a range of from about 45° C. to about 50° C. The reaction mixture was maintained heated at this temperature range for about 4.5 hours to ensure complete reaction and then cooled to about ambient room temperature.

The cooled reaction mixture was poured into about 500 mL methanol with stirring. A tan precipitate formed which was isolated and collected by filtration and dried. The yield was 12.5 g of crosslinked polysuccinimide.

EXAMPLES 2–6

Other crosslinked polysuccinimides were successfully made by following the method of Example 1, except that the solvent, diamine crosslinking agent, $M_w$ of the $M_w$ polysuccinimide and Mol % of diamine crosslinking agent employed were as listed in Table 2.

TABLE 2

CROSSLINKED POLYSUCCINIMIDES

| Example | Diamine | PS $M_w$ | Mol % Diamine | Solvent |
|---|---|---|---|---|
| 1 | MXDA | 5030 | 11 | DMSO |
| 2 | MXDA | 5030 | 7 | DMSO |
| 3 | EDA | 5030 | 5 | DMSO |
| 4 | 1,3-BAC | 5030 | 7 | DMF |
| 5 | DETA | 2040 | 7 | DMF |
| 6 | EDR-148 | 2040 | 3.5 | DMF |

Notes to Table 2:
Diamine = diamine organic crosslinking agent
MXDA = metaxylylenediamine
EDA = ethylenediamine
1,3-BAC = 1,3-bis(aminomethyl)cyclohexane
EDR-148 = triethyleneglycol diamine, molecular weight approx. 148 (JEF-FAMINE™ EDR-148, Texaco Chemical Company)
DETA = diethylenetriamine
PS = polysuccinimide homopolymer
$M_w$ = weight average molecular weight
DMF = dimethylformamide
DMSO = dimethylsulfoxide Soluble Crosslinked Polyaspartates, Method A The following general two-stage method of producing soluble crosslinked polyaspartates will be referred to as Method A. A crosslinked polysuccinimide is first produced by the General Method described above. The crosslinked polysuccinimide is then suspended in a sufficient volume of aqueous sodium hydroxide solution calculated to theoretically completely hydrolyze any remaining uncrosslinked succinimide monomer units in the polymer to produce a soluble crosslinked polyaspartate. The pH of the resulting aqueous solution can be adjusted to whatever value desired.

The crosslinked polyaspartate then can be either substantially dried to a solid or utilized as an aqueous solution. This method is illustrated in Example 7.

EXAMPLE 7

Synthesis of Soluble Crosslinked Polyaspartates By Method A

An aqueous slurry of the crosslinked polysuccinimide product of Example 1 (about 6 grams in water) was prepared and sodium hydroxide solution (about 39 mL, 1N, 39 mmol) was then added. A substantially homogeneous solution was obtained in about 15 minutes. The solution was then stirred at a temperature of about 25° C. for about 2 hours. Initially, the pH of the solution was about 12.6. After 2 hours, the pH was about 11.8.

The pH of the solution was then adjusted to about 9.5 with about 6 mL of 1N HCl. As shown in Table 3, the molecular weight data for the resulting crosslinked sodium polyaspartate (Polymer P1) were a $M_w$ of about 75,900, $M_n$ of about 7,900, and an $M_w/M_n$ of about 9.6.

Other soluble, crosslinked polyaspartates are listed in Table 3 as Polymers P2–P6 which were also successfully produced by Method A employing polysuccinimides crosslinked by the general method above with the Mol % of diamine organic crosslinking agent as shown. The molecular weight data values of the crosslinked polyaspartates Polymers P2–P6 obtained ranged from a $M_w$ of about 2,500 to about 78,000, a $M_n$ of about 1563 to about 4,000 and a $M_w/M_n$ of about 1.48 to about 19.

TABLE 3

CROSSLINKED POLYASPARTATES OF EXAMPLE 7

| Polymer | Diamine | PS $M_w$ | Mol % Diamine | CPA $M_w$ | $M_n$ | $M_w/M_n$ | Method |
|---|---|---|---|---|---|---|---|
| P1 | MXDA | 5030[1] | 11 | 75900 | 7900 | 9.6 | A |
| P2 | MXDA | 5030[1] | 7 | 20100 | 3800 | 5.3 | A |
| P3 | EDA | 5030[1] | 5 | 11300 | 2080 | 5.4 | A |
| P4 | 1,3-BAC | 5030[1] | 7 | 78000 | 4000 | 19 | A |
| P5 | DETA | 2040[2] | 7 | 10400 | 1220 | 8.6 | A |
| P6 | EDR-148 | 2040[2] | 3.5 | 2500 | 1563 | 1.48 | A |
| P7 | DETA | 2040[2] | 7 | 3400 | 1200 | 2.88 | B |

[1] $M_n$ = 1750, $M_w/M_n$ = 2.9
[2] $M_n$ = 740, $M_w/M_n$ = 2.8
Notes to Table 3:
Diamine = diamine organic crosslinking agent
MXDA = metaxylylenediamine
EDA = ethylenediamine
1,3-BAC = 1,3-bis(aminomethyl)cyclohexane
EDR-148 = triethyleneglycol diamine, molecular weight approx. 148 (JEF-FAMINE™ EDR-148, Texaco Chemical Company)
DETA = diethylenetriamine
CPA = crosslinker polyasparate
PS = polysuccinimide homopolymer
$M_w$ = weight average molecular weight
$M_n$ = number average molecular weight
$M_w/M_n$ = polydispersity Soluble, Crosslinked Polyaspartates, Method B An alternative general method for producing soluble crosslinked polyaspartates in a single reaction vessel will be referred to as Method B. The diamine crosslinking agent is first dissolved in water and then neutralized with hydrochloric acid (HCl) to form the acid salt of the diamine crosslinking agent. Polysuccinimide of a given $M_w$ is then added to the salt solution with good stirring to form a slurry. The initial reaction mixture may be cooled to prevent premature reaction of the succinimide with the diamine crosslinking agent before thorough mixing has occurred.

Next, sufficient aqueous sodium hydroxide is added to neutralize the diamine hydrochloride and to generate free diamine crosslinking agent to react with the polysuccinimide to form crosslinked polysuccinimide. Additional aqueous sodium hydroxide is then added in an amount sufficient to further hydrolyze any unreacted succinimide units in the crosslinked polymer to form crosslinked polyaspartate. A variation of method B can be practiced by sequentially adding the free diamine crosslinking agent to an aqueous slurry of polysuccinimide, and then adding of the sodium hydroxide solution. Method B is illustrated in Example 8.

EXAMPLE 8

Synthesis of Soluble, Crosslinked Polyaspartate by Method B

Diethylenetriamine (DETA) (about 0.38 mL, 3.5 mmol) was added to about 10.5 mL of 1N HCl with stirring. Next, about 5 grams of polysuccinimide (50 mmol succinimide units) having a $M_w$ of about 2040, $M_n$ of about 740 and $M_w/M_n$ of about 2.8 was added to the DETA salt with stirring to form a slurry. An aqueous solution of sodium hydroxide (about 2.1 g, 52.5 mmol in about 10 mL of water) was gradually added to the slurry over a period of about 15 minutes. A red-brown reaction mixture formed. The reaction mixture was stirred at ambient room temperature for about 2 hours and then diluted with about 690 mL water to form a solution of about 1% (w/v) soluble crosslinked sodium polyaspartate (Polymer P7) having a pH of about 10.5. The molecular weight data values for Polymer P7, as shown in Table 3, were a $M_w$ of about 3400, $M_n$ of about 1200 and an $M_w/M_n$ of about 2.8.

For comparison, polyaspartate was prepared by following the procedure of Example 374-2 as disclosed in U.S. Pat. No. 5,286,810 by Wood.

A solution of maleic acid (about 5.8 g, 50 mmol), 30% aqueous ammonia (about 7.5 g, 132 mmol of $NH_3$) and triethyleneglycol diamine (JEFFAMINE™ EDR-148) (about 0.25 mL, 1.75 mmol) was evaporated to dryness over a period of about 30 minutes. A white solid was produced. The white solid was then heated at a temperature of from about 235° C. to about 245° C. for about 5 minutes, removed from the heat and allowed to cool.

The cooled solid was broken up with a spatula 10 and then re-heated to a temperature of from about 235° C. to about 245° C. for about 10 minutes, removed from the heat and allowed to cool. This cooled solid again was broken up with a spatula and then again re-heated to a temperature of from about 235° C. to about 245° C. for about 15 minutes, removed from the heat and allowed to cool to ambient room temperature. A dark brown solid was produced. This solid was then scraped from the flask and weighed. The yield was about 5.2 g.

The dark brown solid was next slurried with about 5 mL of water. An aqueous solution of sodium hydroxide (about 1.9 g in about 4 mL of water) was added over a period of about 5 minutes. The resulting solution was stirred for about 15 minutes to form a clear brown solution.

GPC analysis of the polyaspartate product indicated it had a $M_w$ of about 5,280, $M_n$ of about 807, an $M_w/M_n$ of about 6.54 and a peak molecular weight ($M_p$) of about 1,500. By comparison, when polyaspartate is prepared in the absence of diamine, the molecular weight data values of the polymer obtained are typically a $M_w$ of about 1900 to about 2100, a $M_w/M_n$ of about 2.4 to about 3.3 and an $M_p$ of about 1000 to about 1800.

As is clear from the data shown in Table 3, the methods of the present invention provide a means of extending the molecular weight of polysuccinimide and polyaspartate polymers via a simple crosslinking procedure. Weight average molecular weight ($M_w$) increases of at least about 1.25 times to about 16 times the weight of the original starting polymer were found.

The methods of the present invention were found to have an effect on the weight average and number average molecular weights ($M_w$ and $M_n$) and on polydispersity ($M_w/M_n$) as measured by GPC. In the multi-step Method A of first preparing crosslinked polysuccinimide at diamine crosslinking agent concentrations of greater than about 5 mol %, soluble crosslinked polyaspartates of higher molecular weights and increased polydispersity were produced as illustrated by Polymers P1–P5 of Example 7. When lower mol % concentrations of diamine crosslinking agent were used, as for example in preparing polymer P6 of Example 7, the main effect observed was an increase of about 2 fold in the number average molecular weight ($M_n$), with only a modest increase in the weight average molecular weight ($M_w$). This also resulted in a lower polydispersity ($M_w/M_n$), which is often a desirable effect.

Method B as described for preparing Polymer P7 in Example 8 in a single reaction vessel by adding aqueous base to an aqueous slurry of polysuccinimide and a diamine crosslinking agent produced a lesser increase in molecular weight for a given mol % amount of diamine, and a smaller increase in polydispersity of crosslinked polyaspartates.

In contrast, Wood's method of co-polymerizing maleic acid, ammonia and a diamine produced a modest increase in molecular weights over that of polymerization with no diamine base and a large increase in polydispersity.

The higher molecular weights of crosslinked polyaspartates obtained by practicing method A are believed to arise from a high degree of intermolecular crosslinking. The smaller increase in molecular weight of crosslinked polyaspartate obtained by practicing Method B is believed due to a higher ratio of intramolecular to intermolecular crosslinking than was achieved by practicing Method A to produce very little increase in polydispersity.

Thus, the methods of the present invention provide a means of controlling the degree of intramolecular to intermolecular crosslinking of the polymers as well as the molecular weights. In addition, the soluble, crosslinked polyaspartate polymers produced are predominantly polypeptidal in structure and thereby are relatively biodegradable.

The present invention has been described with respect to preferred embodiments but are not limited thereto. It would be apparent to one skilled in the art that the foregoing method illustrations are subject to numerous modifications which do not depart from the spirit and scope of this invention.

What is claimed is:

1. A method of producing soluble, crosslinked polyaspartate comprising the steps of:

a) dissolving a polysuccinimide in a polar aprotic organic solvent;

b) combining the dissolved polysuccinimide with an effective crosslinking amount of an organic crosslinking agent that is an organic base containing at least two primary amine groups to form a crosslinked polysuccinimide product in the resulting reaction mixture;

c) isolating the crosslinked polysuccinimide product obtained by admixing the reaction mixture with a solvent in which the polar aprotic organic solvent is soluble and the crosslinked polysuccinimide product is not;

d) collecting the crosslinked polysuccinimide product; and e) hydrolyzing the collected crosslinked polysuccinimide product to crosslinked polyaspartate, said crosslinked polyaspartate being soluble in polar solvent selected from the group consisting of water, alcohol or mixtures thereof.

2. The method of claim 1 wherein the reaction mixture in step (b) is heated to a temperature in the range of about 20° C. to about 60° C. and maintained at said temperature range until the crosslinked polysuccinimide product forms.

3. The method of claim 2 further including the step of cooling the reaction mixture to ambient room temperature between step (b) and step (c).

4. The method of claim 1 wherein the crosslinked polysuccinimide is collected in step (d) by filtering and drying the crosslinked polysuccinimide.

5. The method of claim 1 further including the step of substantially drying the crosslinked polyaspartate.

6. The method of claim 1 wherein the polysuccinimide in step (a) has a weight average molecular weight of about 500 to greater than about 100,000.

7. The method of claim 1 wherein the amount of organic crosslinking agent based on moles of diamine per mole of succinimide monomer units in the polysuccinimide is present in a mol % amount of about 0.1 to about 30.

8. The method of claim 1 wherein the polysuccinimide in step (a) has weight average molecular weight of about 500 to greater than about 100,000 and the organic crosslinking agent based on moles diamine per mole of succinimide monomer units in the polysuccinimide is present in a mol % amount of about 0.1 to about 30.

9. A crosslinked polyaspartate obtained by the method of claim 1 characterized as a random copolymer comprised primarily of aspartate units in alpha form, beta form, or both, and dimeric aspartamide units with less than about 20% succinimide units, and having a weight average molecular weight of at least about 2,000.

10. A composition of matter comprising a random copolymer of crosslinked polyaspartate characterized as having a weight average molecular weight of at least about 2,000 and being soluble in polar solvent selected from the group consisting of water, alcohol or mixtures thereof.

11. A method of producing a soluble, crosslinked polyaspartate comprising the steps of:
  a) preparing an aqueous solution containing a salt of an organic crosslinking agent that is an organic base containing at least two primary amine groups;
  b) admixing the resulting salt solution with a polysuccinimide to form a reaction mixture;
  c) adding aqueous base to the reaction mixture in an amount sufficient to release an effective crosslinking amount of free organic crosslinking agent to crosslink the polysuccinimide and form a crosslinked polysuccinimide product; and
  d) further base hydrolyzing the crosslinked polysuccinimide product to crosslinked polyaspartate, said crosslinked polyaspartate being soluble in polar solvent selected from the group consisting of water, alcohol or mixtures thereof.

12. The method of claim 11 further including the step of cooling the salt solution to ambient room temperature between step (a) and step (b).

13. The method of claim 11 further including the step of substantially drying the crosslinked polyaspartate.

14. A soluble crosslinked polyaspartate obtained by the method of claim 11 characterized by having a weight average molecular weight of at least about 2,000.

15. A method of producing soluble, crosslinked polyaspartate comprising the steps of:
  a) preparing an aqueous slurry of polysuccinimide;
  b) admixing an organic crosslinking agent comprising an organic base containing at least two primary amine groups with the slurry, the organic crosslinking agent being present in an effective crosslinking amount to form a crosslinked polysuccinimide product; and
  c) base hydrolyzing the crosslinked polysuccinimide product to crosslinked polyaspartate, said crosslinked polyaspartate being soluble in polar solvents selected from the group consisting of water, alcohol or mixtures thereof.

16. A soluble crosslinked polyaspartate obtained by the method of claim 15 characterized by having a weight average molecular weight of at least about 2,000.

17. A method of producing crosslinked polysuccinimide comprising the steps of:
  a) dissolving a polysuccinimide in a polar aprotic organic solvent;
  b) reacting the dissolved polysuccinimide with an effective crosslinking amount of an organic crosslinking agent that is an organic base comprising at least two primary amine groups to form crosslinked polysuccinimide in the resulting reaction mixture;
  c) isolating the crosslinked polysuccinimide obtained by admixing the reaction mixture with a solvent in which the polar aprotic organic solvent is soluble and the crosslinked polysuccinimide is not; and
  d) collecting the crosslinked polysuccinimide.

18. The method of claim 17 wherein the crosslinked polysuccinimide is collected in step (d) by filtering and drying the crosslinked polysuccinimide.

19. The method of claim 17 wherein the polysuccinimide in step (a) has a weight average molecular weight of about 500 to greater than about 100,000.

20. The method of claim 17 wherein the amount of organic crosslinking agent based on moles of diamine per mole of succinimide monomer unit in the polysuccinimide is present in a mol % amount of about 0.1 to about 30.

21. A crosslinked polysuccinimide obtained by the method of claim 17 characterized as a random copolymer comprised of succinimide units and dimeric aspartamide units with less than about 20% aspartate units in alpha form, beta form or both.

22. The method of claim 17 further including the step of hydrolyzing the collected crosslinked polysuccinimide to crosslinked polyaspartate.

23. A method of producing crosslinked polysuccinimide comprising the steps of:
  a) preparing an aqueous solution containing an acid salt of one organic crosslinking agent that is an organic base containing at least two primary amine groups;
  b) admixing the salt solution with a polysuccinimide to form a reaction mixture; and
  c) adding aqueous base to the reaction mixture in an amount sufficient to release an effective crosslinking amount of free organic crosslinking agent to react with and crosslink the polysuccinimide.

24. The method of claim 23 further including the step of hydrolyzing the crosslinked polysuccinimide to crosslinked polyaspartate.

25. A method of producing crosslinked polysuccinimide comprising the steps of:
  a) preparing an aqueous slurry of polysuccinimide; and
  b) admixing an organic crosslinking agent comprising an organic base containing least two primary amine groups with the slurry, the organic crosslinking agent being present in an effective crosslinking amount to form crosslinked polysuccinimide.

26. The method of claim 25 further including the step of hydrolyzing the crosslinked polysuccinimide to crosslinked polyaspartate.

* * * * *